US011797988B2

(12) United States Patent
Gu et al.

(10) Patent No.: US 11,797,988 B2
(45) Date of Patent: Oct. 24, 2023

(54) TRANSACTION PROCESSING

(71) Applicant: VeChain Foundation Limited, Singapore (SG)

(72) Inventors: Jianliang Gu, Shanghai (CN); Bin Qian, Shanghai (CN); Ziheng Zhou, Shanghai (CN)

(73) Assignee: VeChain Foundation Limited, Singapore (SG)

( * ) Notice: Subject to any disclaimer, the term of this patent is extended or adjusted under 35 U.S.C. 154(b) by 238 days.

(21) Appl. No.: 15/733,758

(22) PCT Filed: Apr. 18, 2019

(86) PCT No.: PCT/SG2019/050222
§ 371 (c)(1),
(2) Date: Oct. 19, 2020

(87) PCT Pub. No.: WO2019/203735
PCT Pub. Date: Oct. 24, 2019

(65) Prior Publication Data
US 2021/0241271 A1 Aug. 5, 2021

Related U.S. Application Data

(60) Provisional application No. 62/664,981, filed on May 1, 2018, provisional application No. 62/659,917, filed on Apr. 19, 2018.

(51) Int. Cl.
*G06Q 30/02* (2023.01)
*G06Q 20/40* (2012.01)
(Continued)

(52) U.S. Cl.
CPC ....... *G06Q 20/401* (2013.01); *G06Q 20/0655* (2013.01); *G06Q 20/085* (2013.01);
(Continued)

(58) Field of Classification Search
CPC ............. G06Q 20/401; G06Q 20/0655; G06Q 20/085; G06Q 20/381; G06Q 20/3825;
(Continued)

(56) References Cited

U.S. PATENT DOCUMENTS

| 2007/0100743 | A1* | 5/2007 | Barge | G06Q 99/00 |
| | | | | 705/38 |
| 2008/0052106 | A1* | 2/2008 | Walker | G06Q 30/0208 |
| | | | | 705/1.1 |

(Continued)

FOREIGN PATENT DOCUMENTS

| CA | 3015569 A1 | 8/2017 |
| WO | 2017145021 A1 | 8/2017 |
| WO | 2017161417 A1 | 9/2017 |

OTHER PUBLICATIONS

PCT International Search Report and Written Opinion dated Jul. 31, 2019 in International Application No. PCT/SG2019/050222.
(Continued)

*Primary Examiner* — Thuy N Nguyen
(74) *Attorney, Agent, or Firm* — Downs Rachlin Martin PLLC

(57) ABSTRACT

Embodiments of the present disclosure relate to a method, a device, a computer readable storage medium and a computer program product for transaction processing on a blockchain. In the method, the blockchain node for processing a transaction receives a transaction request including a plurality of fields, the plurality of fields including a transaction task field including a plurality of clauses and each clause of the plurality of clauses indicating one of a plurality of tasks of the transaction. The blockchain node processes the plurality of tasks and determines that the transaction is successfully processed only in response to successfully processing all the plurality of tasks. The transaction processing as provided in the present disclosure enables multiple tasks to be processed (Continued)

through a single transaction procedure on the blockchain in an efficient way.

19 Claims, 4 Drawing Sheets

(51) Int. Cl.
| | |
|---|---|
| *G06Q 30/0283* | (2023.01) |
| *G06Q 20/06* | (2012.01) |
| *G06Q 20/08* | (2012.01) |
| *G06Q 20/38* | (2012.01) |
| *H04L 9/32* | (2006.01) |
| *G06Q 40/03* | (2023.01) |
| *G06F 16/27* | (2019.01) |

(52) U.S. Cl.
CPC ......... *G06Q 20/381* (2013.01); *G06Q 20/389* (2013.01); *G06Q 20/3825* (2013.01); *G06Q 20/3829* (2013.01); *G06Q 20/4037* (2013.01); *G06Q 30/0283* (2013.01); *G06Q 40/03* (2023.01); *H04L 9/3247* (2013.01); *G06F 16/27* (2019.01); *G06Q 2220/00* (2013.01); *H04L 2209/56* (2013.01)

(58) Field of Classification Search
CPC ............. G06Q 20/3829; G06Q 20/389; G06Q 20/4037; G06Q 30/0283; G06Q 40/025; G06Q 2220/00; G06Q 30/06; G06Q 30/0207–30/0277; G06Q 20/223; H04L 9/3247; H04L 2209/56; G06F 16/27
See application file for complete search history.

(56) References Cited

U.S. PATENT DOCUMENTS

| | | | |
|---|---|---|---|
| 2010/0088205 A1* | 4/2010 | Robertson | G06Q 20/102 |
| | | | 705/400 |
| 2015/0073929 A1* | 3/2015 | Psota | G06Q 30/0605 |
| | | | 705/26.2 |
| 2015/0348017 A1 | 12/2015 | Allmen | |
| 2016/0342989 A1* | 11/2016 | Davis | G06Q 20/405 |
| 2017/0012814 A1* | 1/2017 | Zaidi | H04L 41/5061 |
| 2017/0053249 A1* | 2/2017 | Tunnell | G09C 5/00 |
| 2017/0169091 A1* | 6/2017 | Kapadia | G06F 16/273 |
| 2017/0287090 A1* | 10/2017 | Hunn | G06Q 50/18 |
| 2017/0301047 A1* | 10/2017 | Brown | G06Q 20/382 |
| 2018/0025442 A1* | 1/2018 | Isaacson | H04L 63/0861 |
| | | | 705/26.62 |
| 2018/0039667 A1 | 2/2018 | Pierce et al. | |
| 2018/0197238 A1* | 7/2018 | Bergin | G06Q 20/389 |
| 2018/0218176 A1* | 8/2018 | Voorhees | G06Q 20/02 |
| 2019/0073646 A1* | 3/2019 | Wright | G06Q 20/065 |
| 2019/0102716 A1* | 4/2019 | Kass | G06Q 10/063116 |
| 2019/0102758 A1* | 4/2019 | Wright | G06Q 20/0658 |
| 2019/0122317 A1* | 4/2019 | Hunn | H04L 9/0637 |
| 2019/0158275 A1* | 5/2019 | Beck | H04L 63/20 |
| 2019/0220836 A1* | 7/2019 | Caldwell | G06Q 20/38215 |
| 2019/0318424 A1* | 10/2019 | McWilliams | G06Q 20/227 |
| 2019/0356641 A1* | 11/2019 | Isaacson | H04L 9/3231 |
| 2019/0386968 A1* | 12/2019 | Good | G06Q 20/401 |
| 2020/0043217 A1* | 2/2020 | Cilingir | G06T 15/005 |
| 2020/0210164 A1* | 7/2020 | Mathur | G06F 8/65 |

OTHER PUBLICATIONS

Lopez Porto Marcos Jose, "Call for Evidence—Investment Using Virtual Currency or Distributed Ledger Technology." European Securities and Markets Authority. Jul. 20, 2015 (https://www.esma.europa.eu/file/12959/download?token=xTKmhe5x).

* cited by examiner

TRANSACTION PROCESSING

FIELD

Embodiments of the present disclosure generally relate to the field of transaction processing on a blockchain, and more particularly to a method of transaction processing, a device for transaction processing, a non-transitory computer readable storage medium and a computer program product.

BACKGROUND

In the traditional blockchain transaction model, based on an account model, a transaction-based state machine may store information, not restricted to balance information. Moreover, with one or more smart contracts, a blockchain platform may execute, based on consensus, various pre-designed codes to implement various transactions.

However, in the traditional blockchain transaction model, there are still some shortcomings that are not suitable for real transaction application needs. For example, for real transaction applications, such as fund distributions and mass product registration, it is desired to execute multiple tasks as a whole. However, with the traditional blockchain transaction model, the blockchain platform may only implement one task through one transaction procedure and could not implement multiple tasks through only one transaction procedure, thus it is not flexible and efficient for the blockchain platform to deal with complex situations in real transaction applications.

SUMMARY

In general, example embodiments of the present disclosure provide a solution for transaction processing, by which multiple transaction tasks in complex situations can be processed on the blockchain in an efficient way.

In a first aspect, there is provided a method of transaction processing. The method includes: receiving, at a blockchain node for processing a transaction in a blockchain, a transaction request including a plurality of fields, the plurality of fields including a transaction task field, the transaction task field including a plurality of clauses and each clause of the plurality of clauses indicating one task of a plurality of tasks of the transaction; processing the plurality of tasks of the transaction; and only in response to successfully processing all the plurality of tasks, determining that the transaction is successfully processed.

In a second aspect, there is provided a device for transaction processing. The device includes: a memory configured to store one or more programs; and a processing unit coupled to the memory and configured to execute said one or more programs to cause the device to perform the method in the first aspect of the present disclosure.

In a third aspect, there is provided a non-transitory computer readable storage medium having machine executable instructions stored thereon, the machine executable instructions, when executed, causing a machine to perform the method of the first aspect of the present disclosure.

In a fourth aspect, there is provided a computer program product. The computer program product is tangibly stored on a non-transient computer readable medium and includes machine executable instruction, the machine executable instructions, when being executed, causing a machine to perform the method of the first aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

The above and other objects, features and advantages of the present disclosure will be made more apparent by describing exemplary embodiments of the present disclosure in more detail with reference to figures, wherein identical reference signs represent identical parts in the exemplary embodiments of the present disclosure.

Figure 1:
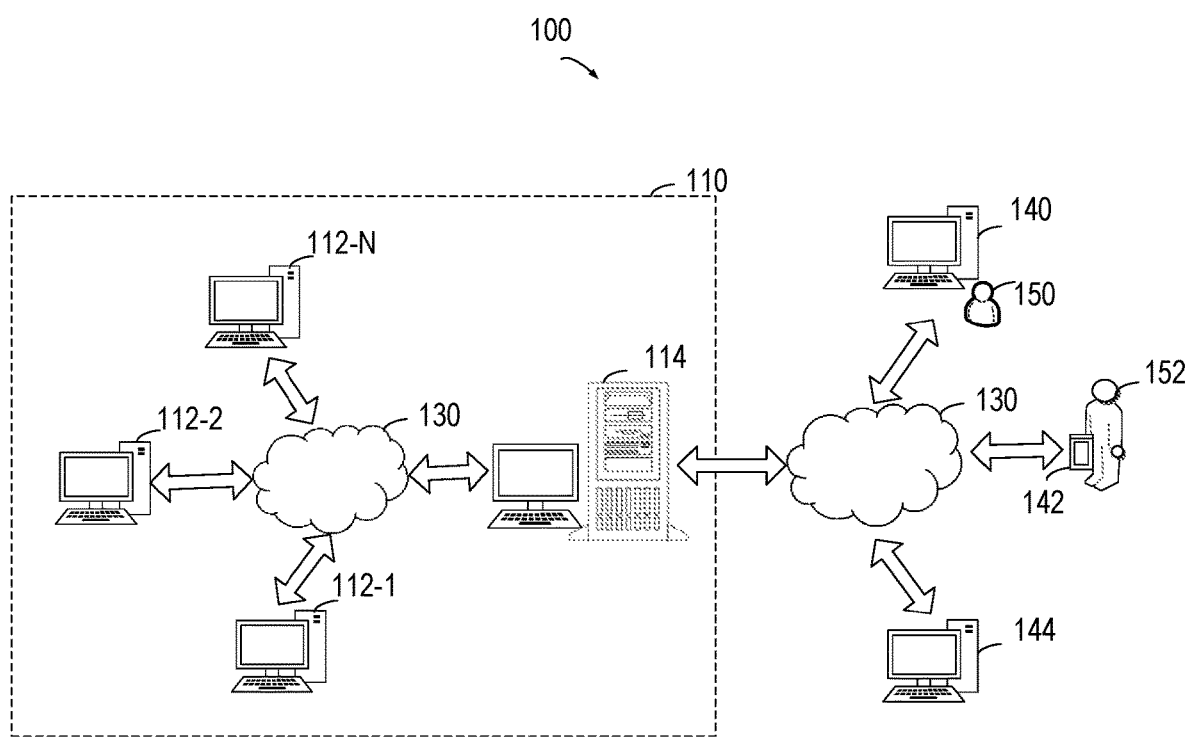
FIG. 1 illustrates a an architecture diagram of a transaction processing system according to embodiments of the present disclosure.

In each drawing, same or corresponding signs indicate the same or corresponding components.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed as a second element, and similarly, a second element could be termed as a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As stated above, in the traditional transaction processing schemes, each transaction processed by the transaction processing node always relates to one task. In this case, multiple tasks initiated by a same initiator cannot be performed through only one transaction procedure. Therefore, it is not flexible and efficient for the blockchain platform to deal with complex situations in real transaction applications.

In order to at least partially address one or more of the above problems, as well as other potential problems, an example embodiment of the present disclosure proposes a transaction processing solution. In the solution, a blockchain node for processing a transaction in a blockchain receives a transaction request comprising a plurality of fields, the plurality of fields comprising a transaction task field comprising a plurality of clauses, each clause of the plurality of clauses indicating one of a plurality of transaction tasks of a transaction. The blockchain node processes the plurality of transaction tasks of the transaction and determines that the transaction is successfully processed only in response to successfully processing all the plurality of transaction tasks.

Herein, a task or a transaction task of the present disclosure may refer to a separate operation on a blockchain to implement a specific function, which may be equivalent to a conventional transaction that is implemented through a conventional transaction procedure in some sense. Correspondingly, a transaction of the present disclosure may include one or more tasks or transaction tasks.

Unlike the traditional transaction processing scheme in which each transaction processed by a transaction processing node directs to only one task, in the above solution, by the transaction request comprising a transaction task field comprising a plurality of clauses, and each clause of the plurality of clauses indicating one of a plurality of tasks of the transaction, multiple tasks indicated in a single transaction request may be processed one by one in the order defined by the transaction task field or in otherwise defined orders during the processing of the transaction request. In this case, multiple transaction tasks initiated by the same transaction initiator may be performed as a whole. Therefore, the present disclosure provides more flexibility and efficiency for blockchain nodes to deal with complex situations in real transaction applications.

Principle and embodiments of the present disclosure will be described in detail below with reference to the accompanying drawings. Reference is first made to FIG. 1, which illustrates an architecture diagram of a transaction processing system 100 according to embodiments of the present disclosure. As shown in FIG. 1, the system 100 comprises a management device 114, a plurality of blockchain nodes 112-1, 112-2 to 112-N for processing blockchain transactions (i.e., transaction processing nodes 112), and a plurality of terminal devices 140, 142 and 144. The management device 114 and the transaction processing nodes 112 may all be blockchain nodes of the blockchain platform 110. The management device 114, the transaction processing nodes 112, and the terminal devices 140, 142 and 144 perform data interaction via the network 130.

It is to be understood that the number of the blockchain nodes and the terminal devices is only for purpose of illustration without suggesting any limitations. The system 100 may include any suitable number of blockchain nodes and terminal devices adapted for implementing embodiments of the present disclosure.

The terminal device may be any end device that may include, but not limited to, a mobile phone, a cellular phone, a smart phone, a voice over IP (VoIP) phone, a wireless local loop phone, a tablet, a personal digital assistant (PDA), a portable computer, a desktop computer, etc. The user 152 may initiate a request for a transaction through the terminal device 142, and the terminal device 142 or the management device 114 may formalize the request from the terminal device 142 into a corresponding transaction request to be delivered to and processed by the blockchain platform 110. The transaction request may indicate one or more transaction tasks to be processed by the blockchain nodes 112. In some embodiments, a wallet application can be run on the terminal device 142. In order to use services provided by the management device 114, the user 150 or 152 may register with the management device 114 via the wallet application, and obtain an associated account ID for uniquely identifying the user 150 or 152 at the management device 114. Furthermore, the user 150 or 152 may generate their own addresses through the wallet application to act as the initiator address or recipient address for their blockchain transactions.

The management device 114 may be a network device for acting as a node of the blockchain platform 110. The management device 114 may include, but not limited to, one or more computers or servers. Via the management device 114, the terminal devices 140, 142 and 144 may receive services from the blockchain platform 110. The management device 114 may receive transaction requests from the registered users 150 and 152 via respective terminal devices, and provide services to the registered users 150 and 152 via their addresses. The management device 114 may be capable of distributing the received transaction request on the blockchain platform 110 or transmitting the received transaction request to any or all of the transaction processing nodes 112, so that the transaction processing nodes 112 may compute a transaction fee and further process the transaction based on the received transaction request. The transaction request sent by the management device 114 may comprise a plurality of fields. These fields may comprise at least a transaction task field comprising a plurality of clauses, and each clause indicates one of a plurality of transaction tasks of a transaction. The plurality of transaction tasks of the transaction may be of the same type or the different type. It is assumed that the management device 114 may transmit a transaction request in which the transaction task field comprises three clauses (i.e., a first clause, a second clause and a third clause). For example, the first clause may indicate a transaction task for transferring an amount of cryptocurrency to an address, the second clause indicates a transaction task for calling a smart contract, and the third clause indicates a transaction task for deploying a new smart contract. As such, it is possible to indicate a plurality of transaction tasks within one transaction request.

Regarding the blockchain platform 110, it is used to process blockchain transactions and deposit transaction result data. Architecturally, the blockchain platform 110 comprises, for example, a basic service layer, a smart contract layer, and a blockchain bottom layer from up to down (not shown). The blockchain platform 110 may comprise the management device 114 and the transaction processing nodes 112. Moreover, the blockchain platform 110 may further include any or all of the terminal devices 140, 142 and 144 if they may act as a blockchain node. In some embodiments, the blockchain platform 110 can be configured to a private blockchain, a public blockchain, or a consortium blockchain.

The transaction processing node 112 may be a network device for acting as a node of the blockchain platform 110. The transaction processing node 112 may include, but not limited to, one or more computers or servers. The transaction processing node 112 may be capable of receiving a transaction request from the management device 114 and computing a transaction fee based on the received transaction request. The transaction processing node 112 may further process a plurality of transaction tasks indicated by the transaction task field included in the received transaction request. After the execution of the transaction, the transaction processing node 112 may further determine whether the transaction is processed successfully by determining whether the plurality of transaction tasks are all successfully processed. If it is determined that the plurality of transaction tasks are all successfully processed, the transaction processing node 112 may determine that the transaction is processed successfully and return a successful transaction response to the management device 114. Otherwise, if any of the plurality of transaction tasks is not successfully processed, for example, due to insufficient account balance, system errors or any other reasons, the transaction processing node 112 may determine that the transaction is not processed successfully and return a failure transaction response to the management device 114. In other words, although a plurality of transaction tasks are included in a single transaction request, executions of the plurality of transaction tasks can be considered as an atomic operation. In this way, it is possible for the management device 114 to monitor whether the transaction including the multiple transaction tasks is processed successfully as a whole, without monitoring whether each task is processed successfully.

Figure 2:
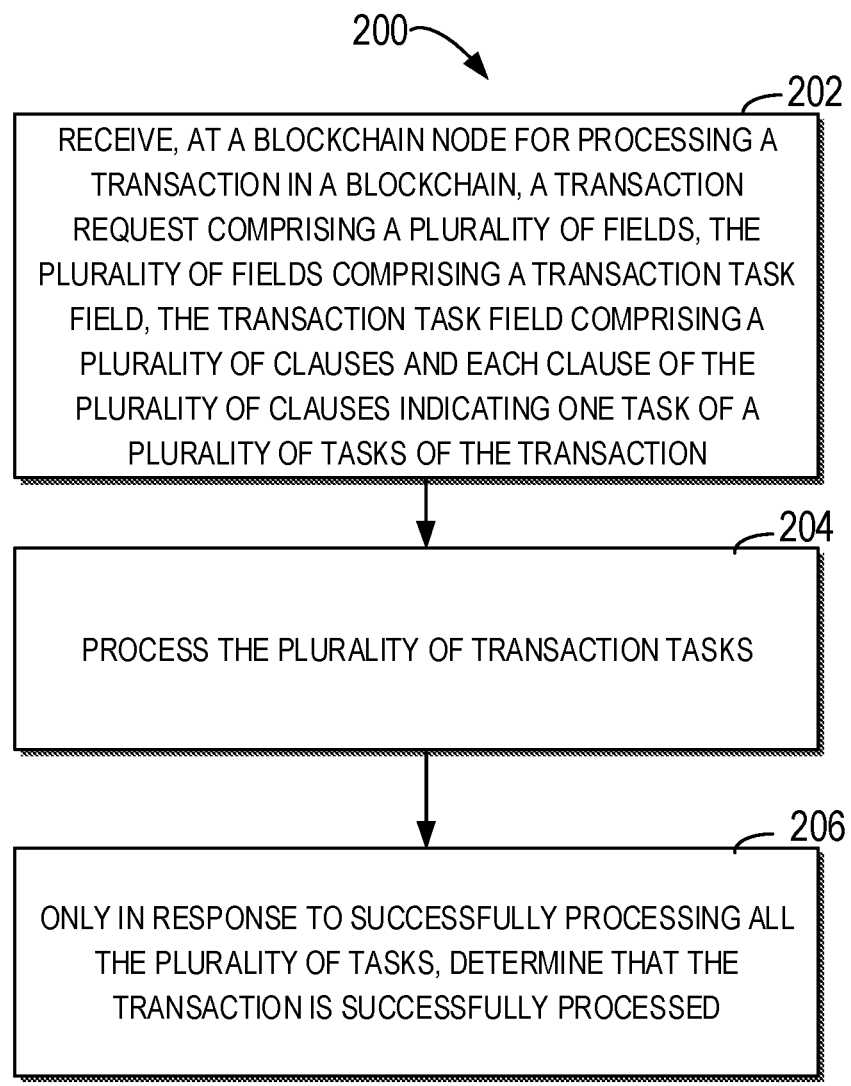
FIG. 2 illustrates a flowchart of a transaction processing method according to embodiments of the present disclosure.

Reference is now made to FIG. 2, which shows a flowchart of a transaction processing method 200 according to embodiments of the present disclosure. For the purpose of discussion, the method 200 will be described with reference to FIG. 1. The method 200 may involve the transaction processing node 112 as illustrated in FIG. 1. In FIG. 2, various actions are performed, for example, by a processor of the transaction processing node 112 as shown in FIG. 1. The method 200 may also include additional actions not shown and/or may omit the actions shown, the scope of the disclosure being not limited in this respect.

At block 202, the transaction processing node 112 receives a transaction request comprising a plurality of fields. The plurality of fields may comprise a transaction task field comprising a plurality of clauses. Each clause indicates one of a plurality of transaction tasks of a transaction. For example, the transaction processing node 112 receives a transaction request from the management device 114. The received transaction request may comprise at least a field for indicating the transaction initiator, a field for indicating the recipient address and a transaction task field for indicating transaction tasks. For example, the transaction task field may indicate a set of clauses. Each clause indicates one of the transaction tasks, such as calling a smart contract, transferring an amount of cryptocurrency to an address, or deploying a new smart contract. With the set of clauses defining transaction tasks, it is possible for the blockchain nodes to process multiple transaction tasks based on one received transaction request, rather than multiple transaction requests.

In some embodiments, each clause in the transaction task field may include one or more information elements for defining a transaction task. For example, each clause includes at least one of the following: a first information element, a second information element and a third information element. The first information element may indicate a recipient address associated with the transaction task, the second information element may indicate an amount of cryptocurrency to be transferred to the recipient address, and the third information element may indicate data for the transaction task indicated by the clause.

In some scenarios, the first information element may refer to an element "To", the second information element may refer to an element "Value", and the third information element may refer to an element "Data". That is, each clause has a To-Value-Data structure. For example, the element "Data" may indicate program codes for account initialization or input data. It would be appreciated that although each clause has been described as including three information elements for defining a transaction task, in some other cases, each clause may contain more information elements to indicate or define the transaction task.

In some embodiments, the transaction task indicated by the clause is not dependent on a further transaction task indicated by a further clause of the plurality of clauses. For example, the plurality of transaction tasks included in a single transaction request may be independent from each other. In some embodiments, the plurality of transaction tasks may include at least two associated transaction tasks in which one task indicated by the clause is dependent on another task indicated by another clause of the plurality of clauses such that the task can be implemented only after the another task has been implemented. For example, one transaction task included in a single transaction request may indicate to deploy a new smart contract and another transaction task included in the transaction request may indicate to execute the new smart contract with some specific parameters.

At block 204, the transaction processing node 112 processes the plurality of transaction tasks based on the received transaction request.

As stated above, each clause in the received transaction request may include a first information element, a second information element and a third information element for defining a transaction task. In this situation, if the transaction processing node 112 determines that the first information element included in a clause is null, this indicates that this clause is to deploy a new smart contract and the program codes of the new smart contract are contained in the third information element (Data). Therefore, the transaction processing node 112 will deploy the new smart contract based on the third information element included in the same clause and transfer the amount indicated in the second information element to the newly deployed smart contract. In this case, the second information element may indicate an amount of cryptocurrency to be transferred to the newly deployed smart contract, and the third information element may indicate data for deploying the smart contract. The data for deploying the smart contract may include command for deploying the smart contract and program codes of the smart contract to be deployed.

In some embodiments, if the transaction processing node 112 determines that the first information element indicates a valid address, then the transaction processing node 112 determines whether the first information element indicates a smart contract address. On one hand, if the transaction processing node 112 further determines that the first information element indicates a smart contract address, then the transaction processing node 112 will call the smart contract corresponding to the smart contract address based on the third information element and transfer the amount of cryptocurrency indicated in the second information element to the smart contract. In this case, the data indicated by the third information element includes parameters for executing the smart contract. On the other hand, if the transaction processing node 112 determines that that the first information element indicates a non-smart-contract address (i.e., a normal wallet address or blockchain address), then the transaction processing node 112 transfers the amount indicated in the second information element to the non-smart-contract address. Upon the determination of the information elements included in each clause, the transaction processing node 112 may determine and process all the transaction tasks within the received transaction request one by one.

Figure 3:
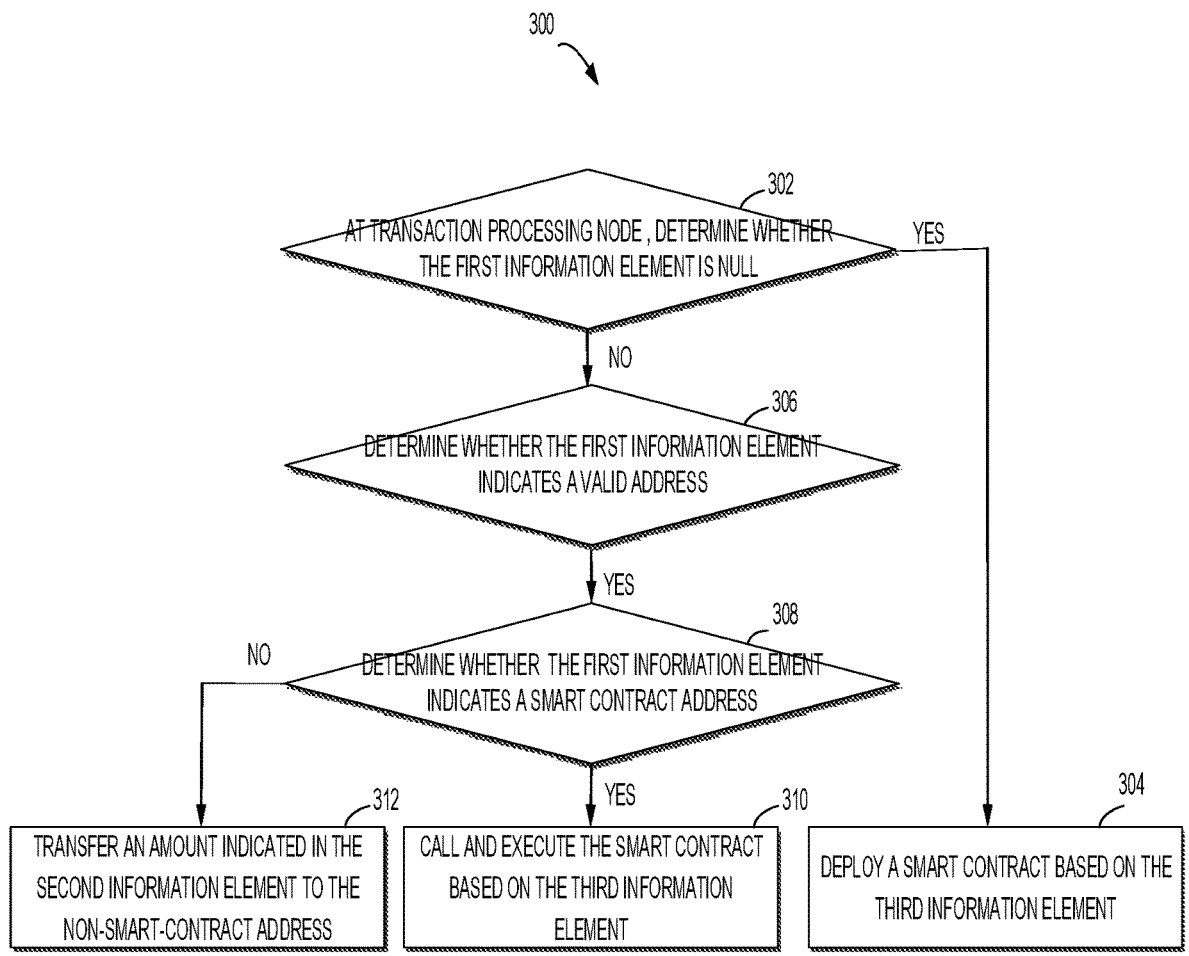
FIG. 3 illustrates a flowchart of a method for processing the plurality of transaction tasks according to embodiments of the present disclosure.

The determination and processing of transaction tasks will be discussed in detail with reference to FIG. 3, which shows a method 300 for determining and processing the plurality of transaction tasks according to embodiments of the present disclosure. The method 300 may also include additional actions not shown and/or may omit the actions shown, the scope of the disclosure being not limited in this respect.

In the method 300, at block 302, the transaction processing node 112 determines whether the first information element is null. If it is determined at block 302 that the first information element is null, at block 304, the transaction processing node 112 deploys a smart contract based on the third information element. Furthermore, the transaction processing node 112 may further transfer the amount indicated in the second information element to the smart contract, if any amount is indicated in the second information element. If it is determined at block 302 that the first information element is not null, at block 306, the transaction processing node 112 determines whether the first information element indicates a valid address. If it is determined at block 306 that the first information element indicates a valid address, at block 308, the transaction processing node 112 will determine whether the first information element indicates a smart contract address. If a smart contract address is determined to be indicated, at block 310, the transaction processing node 112 calls and executes the smart contract based on the third information element. In this case, the third information element may include parameters for executing the smart contract. The executed smart contract is previously deployed in the blockchain platform 110. Furthermore, the transaction processing node 112 may further transfer the amount indicated in the second information element to the smart contract, if any amount is indicated in the second information element. On the other hand, if a non-smart-contract address is determined to be indicated, at block 312, the transaction processing node 112 transfers an amount indicated in the second information element to the non-smart-contract address.

Turning back to FIG. 2, at block 206, the transaction processing node 112 determines the transaction is successfully processed only if the transaction processing node 112 successfully processes all the plurality of tasks. In some embodiments, the transaction processing node 112 determines whether all the plurality of tasks have been successfully processed, and if the transaction processing node 112 determines that all the transaction tasks indicated by the plurality of clauses are successfully processed, the transaction processing node 112 will determine that the transaction defined by the transaction request is processed successfully. In this case, the transaction processing node 112 may further return a successful transaction response to the management device 114. In some other embodiments, if the transaction processing node 112 determines that any one of the transaction tasks fails to be successfully processed, the transaction processing node 112 determines that the transaction defined by the transaction request fails to be processed successfully. In this case, the transaction processing node 112 may further return a failure transaction response to the management device 114.

In the above solution, with a transaction request including a transaction task field including a plurality of clauses for defining a plurality of transaction tasks of a transaction, the multiple transaction tasks contained in a single transaction request can be processed one by one in the order defined by the plurality of clauses or in otherwise defined orders during the processing of the transaction request. In this case, multiple transaction tasks initiated by the same transaction initiator can be performed as a whole. Therefore, the present disclosure provides more flexibility for blockchain nodes to deal with complex situations in real transaction applications. Moreover, due to the plurality of transaction tasks being processed one by one (in the order defined by the plurality of clauses or other predefined orders), it can also provide a secure and efficient way to describe a transaction with multiple steps.

Moreover, as mentioned above, by the transaction processing node 112 determining performance of the transaction based on a result of the processing of all the plurality of transaction tasks, the execution of multiple transaction tasks defined by the plurality of clauses should be an atomic operation, that is, only if all transaction tasks are executed successfully, the current transaction defined by the transaction request is successful. If any transaction task fails, the current transaction fails. In this way, when the transaction initiator initiates a batch of transaction tasks to be processed, it is possible for the initiator or the management device to only monitor whether the current transaction including the multiple tasks are processed successfully as a whole, without monitoring whether each task is successful or not.

In some embodiments, in addition to the transaction task field, the transaction request further includes at least one field indicating at least one of the following: an identifier of an associated transaction (i.e., an associated transaction ID) on which the transaction associated with the transaction request depends, a transaction nonce, a reference of a block into which the current transaction is to be packaged, the number of blocks after which the current transaction expires starting from the reference of the block into which the transaction is to be packaged, a coefficient for transaction fee calculation, a maximum transaction fee that the transaction initiator is willing to pay for the transaction, a reserved field for backward compatibility, signature information of the transaction initiator, and a last byte of the identifier of a genesis block of the blockchain 110. It would be appreciated that although the transaction request has been described as including the above one or more fields, in some other cases, the transaction request may include other fields required by the transaction.

Hereinafter, some of the above at least one field will be described in detail in connection with some specific embodiments of the present disclosure.

In some embodiments, the at least one field includes a DependsOn field that indicates a transaction ID on which the current transaction depends. That is, the processing of the current transaction depends on the successful processing of the transaction indicated by the transaction ID in the DependsOn field. In some embodiments, said successful processing of the transaction may mean that the transaction was successfully processed (i.e., no error is returned), and the result of the transaction has been recorded in the blockchain. In some other embodiments, said successful processing of the transaction may only mean that the result of the transaction has been recorded in the blockchain regardless of whether it was successfully processed. The user or the management device 114 may specify the meaning of "successful processing of the transaction" in advance.

In case that the plurality of fields include the DependsOn field, the method 200 may further include, before processing the plurality of tasks at block 204, determining whether the associated transaction indicated by the transaction ID in the DependsOn field has been processed successfully, and enable the processing of block 204 only if it is determined that the associated transaction has been successfully processed (not shown).

In some traditional blockchain transaction model, the transaction processing node can process a plurality of transactions from the same transaction initiator one by one in a predetermined order, for example in a numerical order indicated by respective nonce indicated in the transactions. However, for the plurality of transactions from different transaction initiators, it is difficult for the above traditional blockchain transaction model to specify the execution order of these transactions. In some other traditional blockchain transaction model, a smart contract may be configured to specify the execution order of the multiple transactions. However, deploying a smart contract to a blockchain platform will be complex and expensive.

Therefore, in the solution described herein, with the DependsOn field, it is possible for the user or the management device 114 to easily specify the execution order of multiple transactions, even though the multiple transactions are from different transaction initiators. For example, Alice may set up a transaction for Bob, and use the DependsOn field to define that the transaction for Bob can only be executed after a transaction with the transaction ID preset by Alice is completed successfully. For example, Alice may specify that a second transaction should be automatically initiated to transfer a certain amount of fee from Alice's account to Bob's account only if a first transaction has been completed successfully. In this case, the transaction request for the second transaction should include a DependsOn field in which the transaction ID of the first transaction is included. Thus, the transaction model according to embodiments of the present disclosure provides a much easier and lower cost approach of processing transactions in a specified order.

In some embodiments, the at least one field includes a BlockRef field that indicates a reference of a block into which the current transaction should be packaged. That is, instead of packaging the current transaction according to processing order or buffering order of transactions in the blockchain, the user or the management device may specify to package the current transaction into a certain block. In some embodiments, the BlockRef field may include 4 bytes for indicating the block height of the block (i.e., the absolute position of the block) to package the current transaction. In some other embodiments, the BlockRef field may include 8 bytes, the first 4 bytes indicating the block height of the block to package the current transaction and the last 4 bytes indicating whether a previous block of the block for packaging exists. For example, if the previous block exists, the last 4 bytes may be part of the block ID of the previous block, while if the previous block does not exist (i.e., the current transaction should be packaged into a "future" block), the last 4 bytes may be set to all "0" (because the ID of the previous block of the block for packaging does not yet exist).

In case that the plurality of fields includes the BlockRef field, the method 200 may further include, after processing the plurality of tasks at block 204 or after determining that the current transaction is successfully processed at block 206, determining a block from the BlockRef field and packing the transaction (i.e., data associated with the processed plurality of tasks of the transaction) into the determined block (not shown).

In some embodiments, the at least one field includes an Expiration field that may be used to determine the expiration time of the current transaction. Herein, expiration means discarding or stopping processing the current transaction. For example, the Expiration field may indicate the number of blocks (i.e., block interval) after which the current transaction expires starting from the block indicated in the BlockRef field. In this case, the expiration time of the current transaction may be determined from the combination of the BlockRef field and the Expiration field. For another example, the Expiration field may directly indicate the expiration time of the current transaction such as the height or the reference of the "expired block". In some embodiments, the Expiration field may include 4 bytes.

In case that the plurality of fields includes the Expiration field, the method 200 may further include, before determining that the current transaction is successfully processed, determining whether a preset block is reached based on the Expiration field or the combination of the BlockRef field and the Expiration field and causing the transaction to expire if it is determined that the preset block is reached.

In the solution described herein, by configuring the Expiration field in the transaction request and causing the transaction defined by the transaction request to expire based on the Expiration field, it is possible for the transaction initiator to expire the transactions initiated by him. With such a configurable feature, the transaction initiator would no longer be troubled by the situation that a transaction was stuck for hours or even days to wait to be processed, and the transaction initiator could do nothing about it. With the Expiration field in the transaction requests, the transactions will be safer since it may prevent the transactions from being hijacked and later re-used to cause problems.

In some embodiments, the at least one field includes a Nonce field for indicating a transaction nonce. The Nonce field may be used to calculate the transaction ID. By setting the Nonce, the user or the management device 114 may affects the calculation of the transaction ID, which ensures that each transaction has a unique transaction ID.

In some embodiments, the at least one field includes a GasPriceCoef field for indicating a coefficient for transaction fee calculation, a Gas field for indicating a maximum transaction fee that the transaction initiator is willing to pay for the current transaction, a Reserved field for backward compatibility, a Signature field for indicating signature information of the transaction initiator; and a ChainTag field for indicating a last byte of the identifier of a genesis block of the blockchain 110 for preventing the cross-chain replay attack. Herein, the signature information of the transaction initiator is a signature generated by the transaction initiator signing all the other fields in the transaction request with the private key of the transaction initiator.

Regarding the unique identifier of the transaction (i.e., the transaction ID), in some embodiments, it is generated based on the transaction request and an address of the transaction initiator. For example, the identifier of the transaction may be generated by hashing the address of the transaction initiator and a part of the plurality of fields. The part of the plurality of fields may be all fields in the transaction request excluding a field indicating signature information of the transaction initiator. For example, in the VeChainThor blockchain, every transaction is given a unique transaction ID (i.e., TxID). The transaction ID can be calculated based on the following formula (1):

$$TxID = hash(hash(\Omega), signer\_addres) \quad (1),$$

where $\Omega$ represents all the fields in the transaction request excluding the Signature field. The "signer_addres" represents address of the transaction initiator. By excluding the Signature field in determining the transaction ID, any entity in the blockchain (the terminal device, the management device or the blockchain nodes, for example) may calculate the transaction ID without the signature of the transaction initiator.

In some traditional blockchain transaction model, for example, the account nonce is used as a counter to ensure that each transaction can only be processed once. Although it provides a solution to prevent replay attacks, in practice, a transaction can be executed only when its nonce is equal to the transaction initiator's account nonce. A transaction might fail for a number of reasons, for example, insufficient account balance to complete the transaction, or transaction fees exceeding a limit specified by the transaction initiator. If there is a transaction failed, the account nonce would remain unchanged, which would result in all the transactions with larger nonces being rejected by the blockchain nodes. Therefore, in the traditional blockchain transaction model, if a transaction initiator sent out multiple transactions at the same time (which is very likely for an enterprise user when he/she, for example, registers products or updates records), once one transaction failed, all other transactions with larger nonces would be rejected by the blockchain nodes.

By contrast, in the solution described herein, when validating a given transaction, the management device 114 and/or the transaction processing node 112 computes a transaction ID (i.e., TxID) associated with the transaction request, and checks whether the computed transaction ID has been used before, instead of checking the current account nonce. The management device 114 and/or the transaction processing node 112 will rejects any transaction whose transaction ID already exists. By generating the transaction ID by hashing the transaction initiator address and the part of the plurality of fields in the transaction request and rejecting any transaction whose transaction ID already exists, it is possible for the management device and/or the transaction processing node 112 to prevent the replay attacks.

Moreover, in the solution described herein, by generating the transaction ID by hashing the address of the transaction initiator and all the fields in transaction request except the Signature field, for any two transactions, as long as they had a field with different values, their transaction IDs would be different. Therefore, it is possible to generate a new transaction ID by adjust the transaction nonce included in the Nonce field. With such a mechanism, the transaction initiator can easily produce multiple transactions with different transaction IDs, which means that the multiple transactions could be sent off at the same time and would be processed by the transaction processing nodes independently.

In some embodiments, in the method 200, the transaction processing node 112 may determine a transaction fee for processing the transaction. The transaction fee refers to the cost for processing the blockchain transaction, which is usually paid by the transaction initiator to the transaction processing node 112 for processing the transaction. Transaction fees may be fixed or not fixed, which depends on the consensus mechanism of the different blockchains. In some embodiments, the transaction fee for the blockchain node for processing the transaction consists of two parts, one being a fixed expense and the other being a non-fixed expense. In some embodiments, the non-fixed expense may be determined on the basis of the content of tasks to be processed, such as the computational complexity or resources to be consumed for the tasks.

Different types of transaction tasks may vary greatly in terms of complexity or resources to be consumed. In some embodiments, the non-fixed expense of the transaction fee is determined based on at least types of the plurality of transaction tasks and data for the plurality of transaction tasks such as the data in the above third information elements of the plurality of clauses. In some embodiments, the data for the plurality of transaction tasks includes at least program codes for account initialization or input data. In some embodiments, the types of the transaction tasks for example include transferring an amount of cryptocurrency to the non-smart-contract address, calling a smart contract or deploying a new smart contract.

In some embodiments, the transaction processing node 112 determines the non-fixed expense based on the number of bytes of the third information elements in the plurality of clauses being equal to a first predefined value and the number of bytes of the third information elements in the plurality of clauses being different from the first predefined value. In some embodiments, the first predefined value is zero.

Regarding the transaction fee, in some embodiments, it may be calculated by the following formula (2):

$$g_{total} = g_0 + \sum_i \left( g^i_{type} + g^i_{data} + g^i_{vm} \right), \quad (2)$$

where $g_{total}$ represents the calculated transaction fee (for example the transaction fee in unit of gas) for processing the transaction defined by the transaction request; $g_0$ represents a fixed expense for the whole transaction; i represents a serial number (i.e., $i^{th}$ clause) among the plurality of clauses included in the transaction task field of the transaction request; $g^i_{vm}$ represents the expense returned by a virtual machine in a blockchain node (the transaction processing node 112 or the management device 114) executing the transaction task indicated by the $i^{th}$ clause; $g^i_{type}$ represents the expense depending on the type of the transaction task indicated by the $i^{th}$ clause; and $g^i_{data}$ represents the expense depending on the data in the third information element of the $i^{th}$ clause.

For example, the fixed expense $g_0$ is 5000 gas. If a transaction task indicated by the $i^{th}$ clause is to deploy a smart contract, then the $g^i_{type}$ is 48000 gas, and if the $i^{th}$ clause indicates other types of transaction task, for example, transferring an amount to an account, then $g^i_{type}$ is 16000 gas. In some embodiments, $g^i_{data}$ may be calculated by the following formula (3):

$$g^i_{data} = 4 * n^i_z + 68 * n^i_{nz}, \quad (3)$$

where $n^i_z$ represents the number of bytes being equal to zero within the data in the third information element of the $i^{th}$ clause, and $n^i_{nz}$ represents the number of bytes being different from zero within the data in the third information element of the $i^{th}$ clause. In some embodiments, the transaction fee may be multiplied by the gas price.

In the solution described herein, by including multiple tasks within one transaction request and processing the multiple tasks through a single transaction procedure, the fixed expense can be saved. For example, given the fixed expense for a transaction, if there are three tasks to be completed, compared to perform the three tasks through three independent transaction procedures, twice of the fixed expense will be saved by performing the three tasks through a single transaction procedure according to embodiments of the present disclosure.

Figure 4:
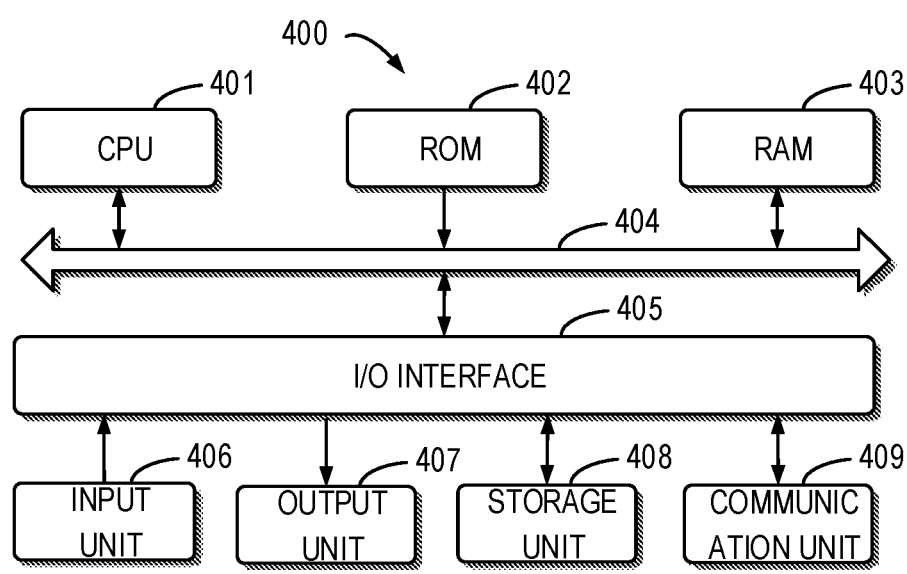
FIG. 4 schematically illustrates a block diagram of an example device suitable for implementing embodiments of the present disclosure.

FIG. 4 illustrates a block diagram of an electronic device 400 adapted to implement an implementation of the subject matter described herein. The device 400 may be used to implement one or more hosts (e.g., the management device 114, the blockchain nodes 112-1, 112-2 to 112-N for transaction processing shown in FIG. 1) of management transaction system 100 shown in FIG. 1. As shown in FIG. 4, the device 400 comprises a central processing unit (CPU) 401 which is capable of performing various actions and processes in accordance with computer program instructions stored in a read only memory (ROM) 402 or computer program instructions loaded from a storage unit 408 to a random access memory (RAM) 403. In the RAM 403, various programs and data as required by operation of the device 400 are stored. The CPU 401, the ROM 402 and the RAM 403 are connected to one another via a bus 404. An input/output (I/O) interface 405 is also connected to the bus 404.

The following components of the device 400 are connected to the I/O interface 405: an input unit 406 including a keyboard, a mouse, or the like; an output unit 407 including various displays, loudspeakers and the like; the storage unit 408 such as a disk, an optical disk or the like; a communication unit 409 such as a network card, a modem, a wireless communication transceiver or the like. The communication unit 409 allows the device 400 to exchange information/data with other devices through a computer network such as the Internet and/or various telecommunication networks.

The processing unit 401 performs various methods and processing described above, for example, performs the methods 200 and 300. For example, in some embodiments, the methods 200 and 300 may be implemented as a computer software program, which is stored in a machine-readable medium, for example the storage unit 408. In some embodiments, part of or all the computer program may be loaded into and/or installed on the device 400 via the ROM 402 and/or the communication unit 409. When the computer program is loaded to the RAM 403 and executed by the CPU 401, one or more operations of the methods 200 and 300 described above may be performed. Alternatively, in other embodiments, the CPU 401 may be configured in any other proper manners (e.g., by virtue of a firmware) to perform one or more actions of the methods 200 and 300.

It needs to be further appreciated that the present disclosure may be implemented as a method, an apparatus, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which may implement aspects of the functions/actions specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device may implement the functions/actions specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a segment, or portion of codes, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The depictions of the various embodiments of the present disclosure have been presented for purposes of illustration, but are not intended to be exhaustive or limited to the embodiments disclosed. Many modifications and variations will be apparent to those of ordinary skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A method of processing a blockchain transaction, the method comprising:
   receiving, at a blockchain node for processing a transaction in a blockchain, a transaction request comprising a plurality of fields, the plurality of fields comprising a transaction task field, the transaction task field comprising a plurality of clauses and each clause of the plurality of clauses defining one task of a plurality of tasks of the transaction defined by the plurality of clauses, wherein each task corresponds to a separate operation on the blockchain to implement a specific function and record the result thereof on the blockchain, wherein the tasks include at least one of calling a smart contract and deploying a smart contract;
   determining, by the blockchain node and from the plurality of clauses, the plurality of tasks to be processed;
   processing the plurality of tasks of the transaction as determined from the plurality of clauses; and
   only in response to successfully processing all the plurality of tasks, determining that the transaction is successfully processed.

2. The method according to claim 1, wherein at least one of the plurality of clauses comprises:
   a first information element indicating a recipient address associated with the task,
   a second information element indicating an amount of cryptocurrency to be transferred to the recipient address, and
   a third information element indicating data for the task indicated by the at least one clause.

3. The method according to claim 2, wherein processing the plurality of tasks of the transaction comprises:
   in response to determining that the first information element is null, deploying a smart contract based on the third information element and transferring the amount indicated in the second information element to the smart contract, the data indicated by the third information element comprising program codes of the smart contract.

4. The method according to claim 2, wherein processing the plurality of transaction tasks of the transaction comprises:
   in response to determining that the first information element indicates a valid address, determining whether the first information element indicates a smart contract address; and
   in response to determining that the first information element indicates a smart contract address, executing a smart contract corresponding to the smart contract address based on the third information element and transferring the amount indicated in the second information element to the smart contract, the data indicated by the third information element comprising parameters for executing the smart contract.

5. The method according to claim 4, wherein processing the plurality of transaction tasks of the transaction further comprises:
   in response to determining that the first information element indicates a non-smart-contract address, transferring the amount indicated in the second information element to the non-smart-contract address.

6. The method according to claim 1, wherein the task indicated by one of the clauses is not dependent on a further task indicated by a further clause of the plurality of clauses.

7. The method according to claim 1, wherein the task indicated by one of the clauses is dependent on a further task indicated by a further clause of the plurality of clauses such that the task can be implemented only after the further task has been implemented.

8. The method according to claim 1, wherein the plurality of fields indicate at least one of the following:
    an identifier of an associated transaction on which the transaction associated with the transaction request depends,
    a transaction nonce,
    a reference of a block into which the transaction is to be packaged,
    an expiration field to determine expiration time of the transaction,
    a coefficient for transaction fee calculation,
    a maximum transaction fee that an initiator of the transaction is willing to pay for the transaction,
    a reserved field for backward compatibility,
    signature information of the initiator of the transaction, and
    a last byte of an identifier of a genesis block of the blockchain.

9. The method according to claim 1, further comprising:
    determining whether the plurality of fields indicate an identifier of an associated transaction on which the transaction associated with the transaction request depends;
    in response to determining that the plurality of fields indicate the identifier of the associated transaction, determining whether the associated transaction has been processed successfully; and
    in response to determining that the associated transaction has been processed successfully, enabling the plurality of tasks of the transaction to be processed.

10. The method according to claim 1, wherein the blockchain is an account model blockchain and the transaction is associated with a unique identifier, and the unique identifier of the transaction is generated based on the transaction request and an address of an initiator of the transaction wherein the method further comprises, prior to performing the processing step, validating the transaction request by confirming the unique identifier has not been used in a previous blockchain transaction.

11. The method according to claim 10, wherein the unique identifier of the transaction is generated by hashing the address of the initiator of the transaction and a part of the plurality of fields, the part of the plurality of fields being all fields in the transaction request excluding a field indicating signature information of the initiator of the transaction, wherein the fields include a transaction nonce field.

12. The method according to claim 1, further comprising:
    determining a block based on one of the plurality of fields indicating a reference of the block into which the transaction is to be packaged; and
    packaging data associated with the processed plurality of tasks of the transaction into the determined block.

13. The method according to claim 1, further comprising:
    in response to reaching a preset block based on the plurality of fields, causing the transaction to expire.

14. The method according to claim 1, further comprising:
    determining a transaction fee for processing the transaction, the transaction fee comprising at least a fixed expense and a non-fixed expense.

15. The method according to claim 14, wherein the non-fixed expense of the transaction fee is determined based on at least respective types of the plurality of tasks and data for the plurality of tasks, the data for the plurality of tasks being included in the plurality of clauses.

16. The method according to claim 14, wherein determining the transaction fee comprises:
    determining the non-fixed expense based on a first number of bytes of data for the plurality of tasks being equal to a first predefined value and a second number of bytes of data for the plurality of tasks being different from the first predefined value.

17. A device for transaction processing, comprising:
    a memory configured to store one or more programs; and
    a processing unit coupled to the memory and configured to execute said one or more programs to cause the device to perform the method according to claim 1.

18. A non-transitory computer readable storage medium having machine executable instructions stored thereon, the machine executable instructions, when executed, causing a machine to perform the method according to claim 1.

19. A computer program product being tangibly stored on a non-transient computer readable medium and comprising machine executable instruction, the machine executable instructions, when being executed, causing a machine to perform the method according to claim 1.

* * * * *